United States Patent [19]

Nomura et al.

[11] Patent Number: 5,452,464
[45] Date of Patent: Sep. 19, 1995

[54] DATA DRIVEN TYPE INFORMATION PROCESSING APPARATUS CAPABLE OF PROCESSING UNTAGGED DATA HAVING NO TAG INFORMATION

[75] Inventors: Shingo Nomura, Nabari; Tsuyoshi Muramatsu, Tenri; Souichi Miyata, Nara; Tatsuyuki Kuwabara, Mitaka; Masaharu Tomita, Mitaka; Kiyotaka Nagamura, Mitaka; Takao Nakamura, Mitaka, all of Japan

[73] Assignee: Sharp Kabushiki Kaisha, Osaka, Japan

[21] Appl. No.: 134,691

[22] Filed: Oct. 12, 1993

[30] Foreign Application Priority Data

Oct. 14, 1992 [JP] Japan .................. 4-276291

[51] Int. Cl.⁶ .................. G06F 15/82; G06F 13/38
[52] U.S. Cl. .................. 395/775; 395/800; 370/60; 370/94.1; 364/232.22; 364/260; 364/260.1; 364/DIG. 1
[58] Field of Search .................. 395/775, 800, 400, 250, 395/375, 200; 370/60, 94.1

[56] References Cited

U.S. PATENT DOCUMENTS

| | | | |
|---|---|---|---|
| 4,074,254 | 2/1978 | Belser et al. | 365/231 |
| 4,841,436 | 6/1989 | Asano et al. | 395/250 |
| 4,943,916 | 7/1990 | Asano et al. | 395/775 |
| 4,972,315 | 11/1990 | Yamasaki et al. | 395/400 |
| 5,043,880 | 8/1991 | Yoshida | 395/375 |
| 5,093,919 | 3/1992 | Yoshida et al. | 395/800 |
| 5,117,489 | 5/1992 | Komori et al. | 395/375 |
| 5,241,635 | 8/1993 | Papadopoulos et al. | 395/375 |
| 5,341,506 | 8/1994 | Nohmi et al. | 395/800 |
| 5,369,775 | 11/1994 | Yamasaki et al. | 395/800 |
| 5,392,442 | 2/1995 | Komori et al. | 395/800 |

FOREIGN PATENT DOCUMENTS

6421539  1/1989  Japan .................. G06F 9/44

Primary Examiner—Gopal C. Ray

[57] ABSTRACT

A data driven type information processing apparatus includes an information processing unit for carrying out an operation process according to a data flow program based on a data packet with a tag attached thereto, and a tag attaching unit provided in an input stage of the information processing unit. The tag attaching unit attaches a prescribed tag to data without a tag, which is applied externally or from another information processing apparatus connected on-line to generate a tagged data packet, and applies the tagged packet to the information processing unit. An information processing apparatus which is connected on-line to the present information processing apparatus and mutually exchanges the processed data mutually is not limited to either von Neumann type or non Neumann type (data driven type). Accordingly, the data driven type information processing apparatus of the present invention can be used together with various types of information processing apparatus, and a system capable of processing both tagged and untagged data can be constructed.

17 Claims, 5 Drawing Sheets

ADDRESSING BASED ON
DESTINATION INFORMATION

| SUBSEQUENT DESTINATION INFORMATION | SUBSEQUENT INSTRUCTION INFORMATION |
|---|---|
| SUBSEQUENT DESTINATION INFORMATION | SUBSEQUENT INSTRUCTION INFORMATION |
| SUBSEQUENT DESTINATION INFORMATION | SUBSEQUENT INSTRUCTION INFORMATION |

FIG. 4
PRIOR ART

ADDRESSING BASED ON DESTINATION
INFORMATION AND ADDRESS NUMBER
OF GENERATION NUMBER

| MATCHING OPERAND | MATCHING GENERATION NUMBER | VLD=1 |
|---|---|---|
| MATCHING OPERAND | MATCHING GENERATION NUMBER | VLD=1 |
|  |  | VLD=0 |

DATA DRIVEN TYPE INFORMATION PROCESSING APPARATUS CAPABLE OF PROCESSING UNTAGGED DATA HAVING NO TAG INFORMATION

BACKGROUND OF THE INVENTION

1. Field of the Invention

The invention relates generally to a data driven type information processing apparatus, and more particularly to a data driven type information processing apparatus, which resolves externally applied data without a tag and is capable of data driven type information processing of the input data.

2. Description of the Related Art

In a conventional von Neumann information processing apparatus, various instructions are prestored in a program memory as a program. The instructions are sequentially read out from an address specified by a program counter in the program memory and executed.

In contrast, a data driven type information processing apparatus is one of non Neumann information proccessing apparatuses which does not involve a concept of sequential execution of instructions by a program counter. Such a data driven type information processing apparatus employs architecture based on parallel processing of instructions. In this data driven type information processing apparatus, instructions can be executed as soon as the data to be operated on are collected, and a plurality of instructions are driven by the data simultaneously, so that the program is executed in parallel according to the natural data flow. As a result, the time required for operation can be reduced significantly.

Figure 1:
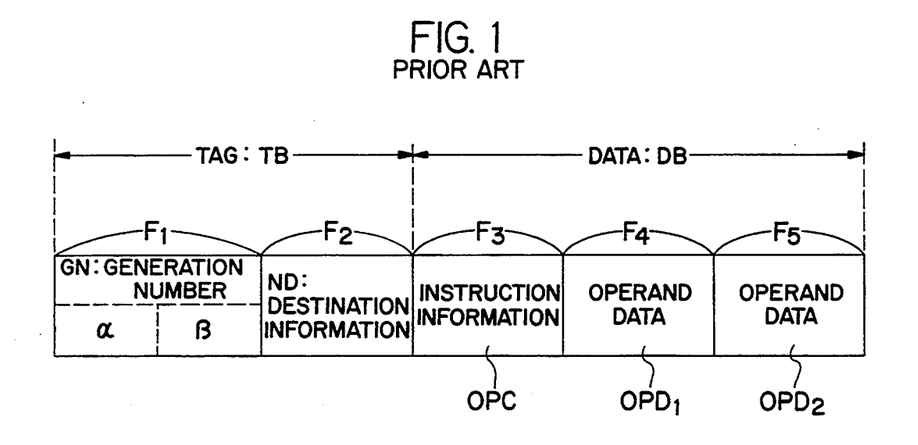
FIG. 1 is a diagram schematically showing a structure of a data packet circulating in a data driven type information processing apparatus.

Referring to FIG. 1, a data packet circulating around each unit of the conventional data driven type information processing apparatus includes a tag TB and data DB. Note that the same type of data packet shown in FIG. 1 is used in the data driven type information processing apparatus of the present invention which will be described later.

The tag TB includes a generation field F1 and a destination field F2, and stores information for uniquely specifying the data packet. The generation field F1 stores a generation number GN including an address number $\alpha$ and a non-address number $\beta$. The generation number GN uniquely specifics each group of data packets when plural groups of data packets are processed in parallel using one data flow program in the data driven type information processing apparatus. The generation number GN will not be updated while information processing is carried out in the data driven type information processing apparatus.

The data DB includes an instruction field F3, a first data field F4 and a second data field F5, and stores a processing instruction and data to be processed based on the processing instruction. Destination field F2 stores destination information ND. Instruction field F3 stores instruction information OPC, first data field F4 stores operand data OPD1, and second data field F5 stores operand data OPD2.

Figure 2:
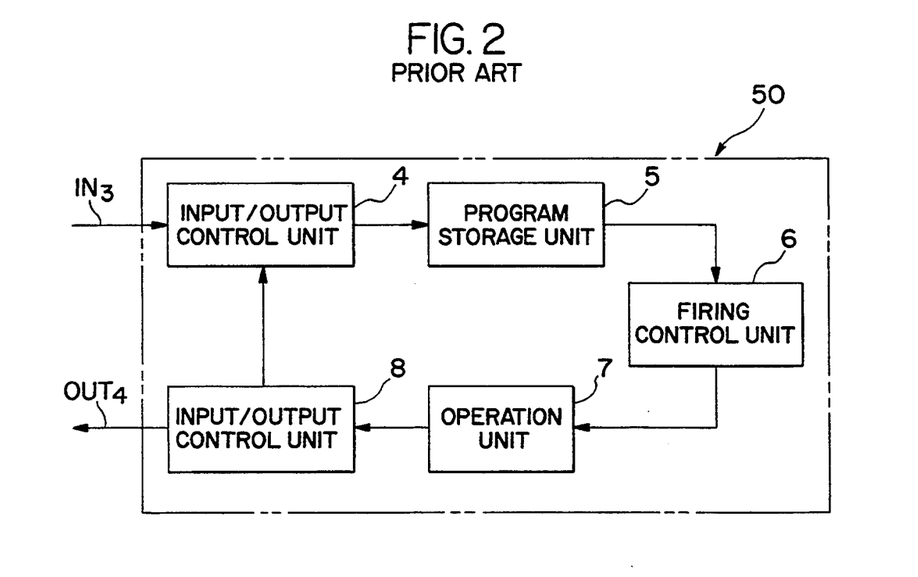
FIG. 2 is a block diagram of the conventional data driven type information processing apparatus.

Referring to FIG. 2, the conventional data driven type information processing apparatus 50 receives a data packet externally in the form of an input signal IN3, processes the data according to a prescribed data flow program, and then sends out the data packet storing the result of processing in the form of an output signal OUT4. The data driven type information processing apparatus 50 includes input/output control units 4 and 8, a program storage unit 5, a firing control unit 6, and an operation unit 7.

The input/output control unit 4 receives externally a data packet through the input signal; In3 and a data packet applied from input/output control unit 8, and applies them sequentially to the program storage unit 5.

Figure 3:
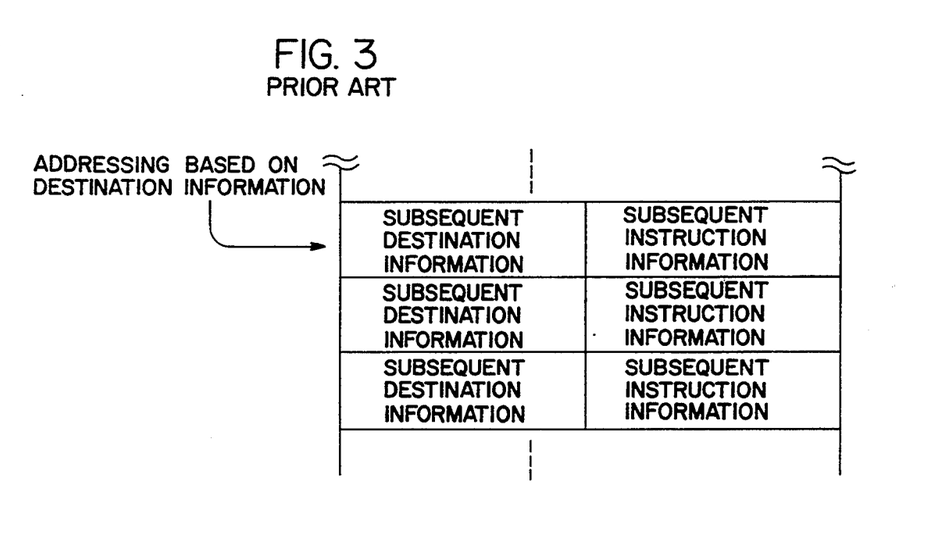
FIG. 3 is a diagram schematically showing a part of the content of a data flow program stored in a program memory of the data driven type information processing apparatus.

The program storage unit 5 includes a program memory (not shown). The program memory prestores a data flow program including a plurality of subsequent destination information and subsequent instruction information shown in FIG. 3. The program storage unit 5 receives the data packet applied from the input/output control unit 4, accesses an address of the program memory specified based on destination information ND of the input data packet, reads out the subsequent destination information and subsequent instruction information, stores the read out information in destination field F2 and instruction field F3 of the input data packet respectively, and outputs the data packet to the firing control unit 6.

The firing control unit 6 includes a matching memory (not shown). The firing control unit 6 receives a data packet applied from the program storage unit 5, and carries out matching of packets using the matching memory. More specifically, the firing control unit 6 detects two data packets which include the same destination information ND and the same non-address number $\beta$ of the generation number GN among the applied data packets, stores the content of field F5 (operand data OPD2) of one data packet in a predetermined data field of the other data packet, and outputs the other data packet to the operation unit 7 (hereinafter referred to as "firing"). Note that the aforementioned one data packet is discarded at this time.

Figure 4:
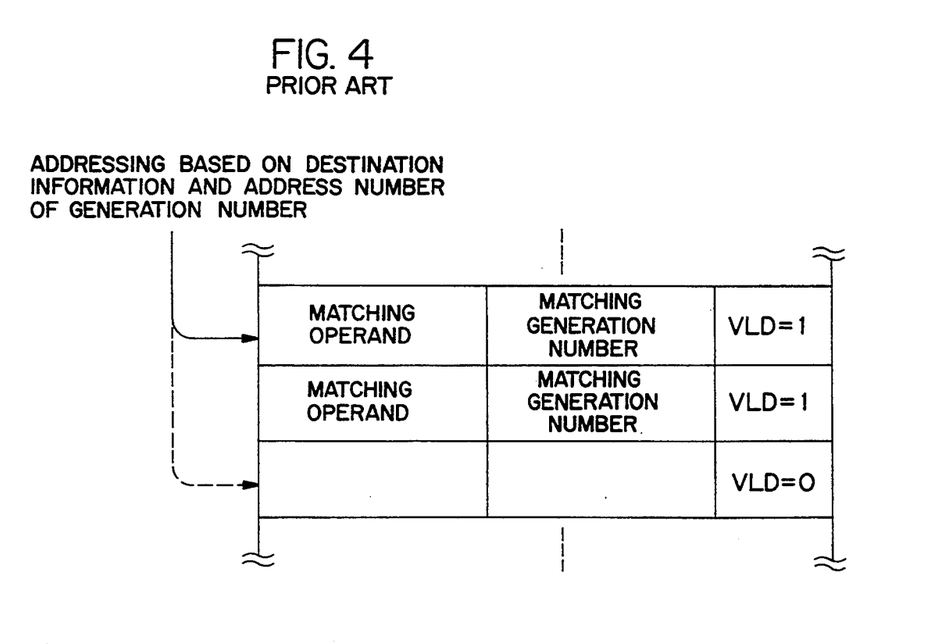
FIG. 4 is a diagram schematically showing a part of the content stored in a matching memory of the data driven type information processing apparatus.

The firing control unit 6 carries out matching of data packets using the matching memory in the following manners. Referring to FIG. 4, the matching memory has a plurality of addressable regions, and each region stores matching operand data, a matching generation number and a firing control flag VLD. The firing control unit 6 accesses an address specified based on the destination information ND of the input data packet and the address number $\alpha$ of the generation number GN. If the firing control flag VLD stored in the accessed region is "0", the firing control unit 6 writes either of operand data OPD1 and OPD2 of the input packet as matching operand data in the accessed region and writes the non-address number $\beta$ of the generation number GN of the input packet into the region of the matching generation number of the accessed region. Then, the firing control unit 6 sets the flag VLD in the appropriate region to "1" and discards the data packet.

In contrast, if the firing control flag VLD stored in the accessed region is "1" and the matching generation number stored in the region and the non-address number $\beta$ of the generation number GN of the input data packet do match, "firing" is detected. The firing control unit 6 applies the data packet to the operation unit 7 in the manner as described above. At this time, the flag VLD in the region is reset to "0".

Even though the firing control flag VLD stored in the accessed region is "1", the firing control unit 6 will not detect firing unless the matching generation number stored in the region and the non-address number $\beta$ of the generation number GN in the input data packet match. In this case, The firing control unit 6 applies the input data packet to the operation unit 7 as a not-yet-firing packet. Thereafter, the not-yet-firing packet is not processed in each unit is circulated in the information processing apparatus 50 until the firing is detected in firing control unit 6.

The operation unit 7 receives the data packet applied from the firing control unit 6 and decodes the instruction information OPC stored in the instruction field F3 of the input data packet. The operation unit 7 carries out a prescribed operation process on operand data OPD1 and OPD2 stored in fields F4 and F5 of the input data packet according to the decoded result and outputs the input data packet to the input/output control unit 8 with the decoded result stored in data field F4.

The input/output control unit 8 selectively outputs the data packet to the input/output control unit 4 or external to the information processing apparatus 50 based on the destination information ND stored in the applied data packet. At this time, the data packet which is output from the information processing apparatus 50 is sent out in the form of an output signal OUT4.

As described above, in the conventional data driven type information processing apparatus 50, while data packet applied in the form of input signal IN 3 circulates around the input/output control unit 4, program storage unit 5, firing control unit 6, operation unit 7, input-/output control unit 8, input/output control unit 4, program storage unit 5, and so on, operation process according to the data flow program prestored in the program memory of the program storage unit 5 proceeds and the operation result is output from the information processing apparatus in the form of output signal OUT4.

Figure 5:
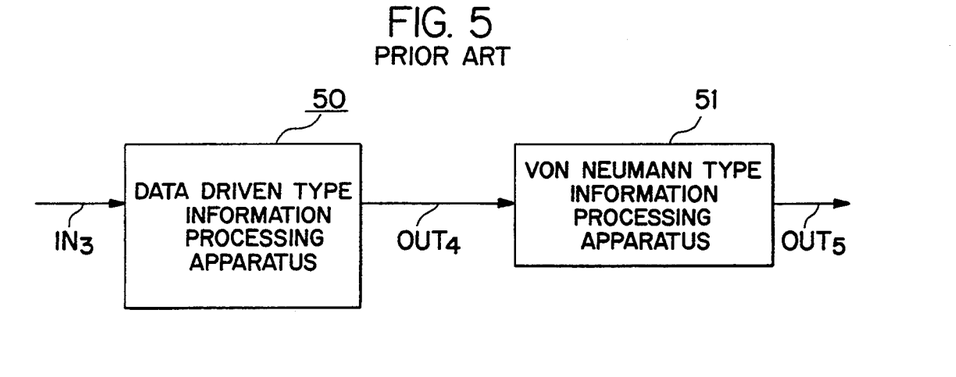
FIG. 5 is a diagram showing a structure of an information processing system including the conventional data driven type information processing apparatus.

FIG. 5 shows an example of the information processing system including the conventional data driven type information processing apparatus shown in FIG. 2 and a von Neumann type information processing apparatus. The information processing system shown in FIG. 5 includes a data driven type information processing apparatus 50 which receives an input signal IN3 from outside the system and outputs an output signal OUT4 after carrying out the data driven type data processing, and a von Neumann type information processing apparatus 51 which sequentially receives the signal OUT4 output from the information processing apparatus 50 and outputs the resulting output signal OUT5 after von Neumann type data processing.

In this system, input signal IN2 and output signal OUT4 include the data packet with the tag TB shown in FIG. 1. The signal OUT5 output from the von Neumann type information processing apparatus 51 does not have a tag TB.

As described above, since the architecture which processes a plurality of data in parallel based on a tag of an input data packet is employed in a conventional data driven type information processing apparatus, data without a tag cannot be processed. Therefore, even though the information processing system shown in FIG. 5 which combines the conventional data driven type information processing apparatus and the von Neumann type information processing apparatus is constructed, the direction in which the data flows must be unidirectional, i.e. from the data driven type information processing unit 50 to the von Neumann type information processing apparatus 51. The reason is that the data driven type information processing apparatus 50 cannot process data without a tag output from the von Neumann type information processing apparatus 51 if the data is input directly. In other words, information processing by way of applying signal OUT5 output from the von Neumann type information processing apparatus 51 again to the data driven type information processing apparatus 50 cannot be carried out conventionally. This is a problem because processing flexibility of the information processing system including the data driven type information processing apparatus cannot be improved.

SUMMARY OF THE INVENTION

An object of the present invention is to provide a data driven type information processing apparatus which can diversify the structure of information processing system including the apparatus, and the process executed therein.

Another object is to provide a data driven type information processing apparatus which, whether or not a tag is attached to data, can receive and process data directly.

Still another object of the present invention is to provide a data driven type information processing apparatus which, whether or not a tag is attached to data, can receive and process data directly from a plurality of paths.

A further object of the invention is to provide a data driven type information processing apparatus which, whether or not a tag is attached to data, receives data directly from a plurality of paths, generates a tagged data packet and processes the data.

An additional object of the present invention is to provide a data driven type information processing apparatus which, whether or not a tag is attached to data, receives data directly from a plurality of paths, generates a tagged data packet having a generation number, and a destination number and processes the data.

The data driven type information processing apparatus in accordance with the invention includes an information processing unit which receives a data packet and executes a predetermined data flow program based on information included in the data packet, and a tag information attaching unit which attaches tag information according to a predetermined procedure to an externally applied data without a tag information to generate a data packet and to apply the same to the information processing unit.

A data packet is generated by attaching a tag to untagged data having no tag information, so that the information processing unit can process the data packet.

The data driven type information processing apparatus in accordance with another aspect of the present invention includes a plurality of tag information attaching units which have respective separate inputs.

The tag information attaching unit of the data driven type information processing apparatus in accordance with still another aspect of the present invention includes a tag information memory for storing a plurality of tag information, and a tag selecting unit which receives the externally applied untagged data, selects tag information specified based on the applied data, attaches the selected information to the untagged data to generate a tagged data packet and outputs the tagged data packet to the information processing unit.

The information processing apparatus which is connected on line directly to the information processing apparatus to carry out data exchange may be either of von Neumann and non Neumann types, which enhances the processing and structural diversity in the information processing system including the information processing apparatus.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

One embodiment of the present invention will be described in detail in the following, with reference to the figures. When data without a tag is input externally, a data driven type information processing apparatus according to this embodiment can carry out data driven type information processing with respect to the input data in the same manner as the conventional data driven type information processing apparatus. The data packet circulating in the data driven type information processing apparatus of the present embodiment is shown in FIG. 1. Other types of data packet may be employed.

Figure 6:
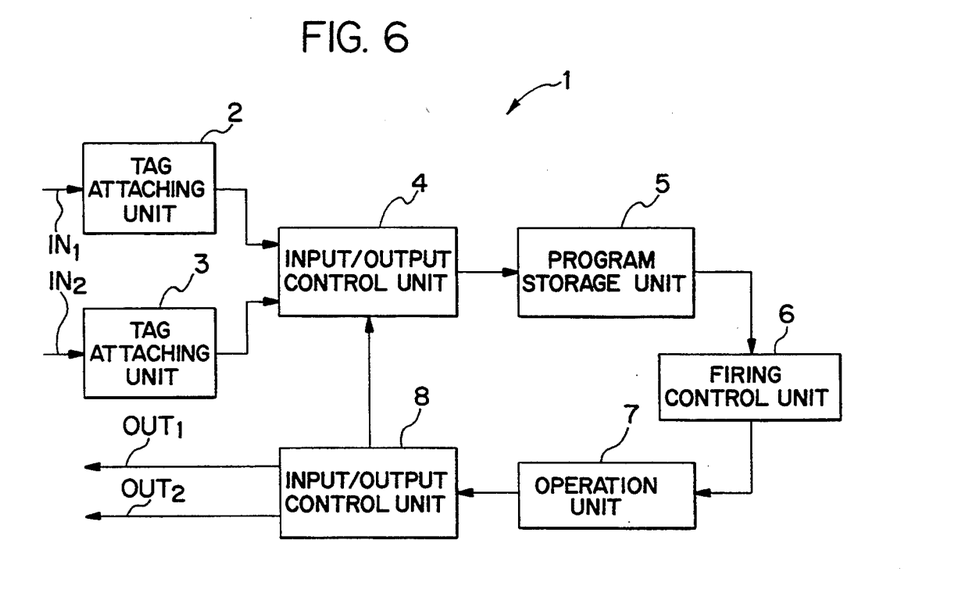
FIGS. 6 and 7 show block diagrams of a data driven type information processing apparatus in accordance with an embodiment of the present invention and one example of a structure of an information processing system including the information processing apparatus.
Figure 7:
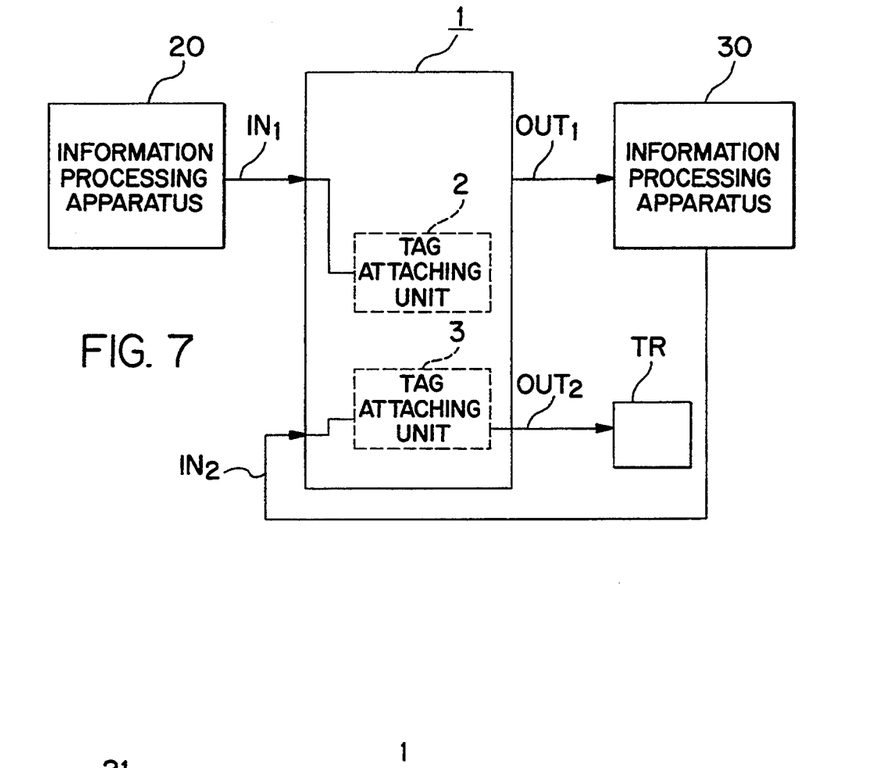

FIGS. 6 and 7 are diagrams showing structures of a block configuration of the data driven type information processing apparatus in accordance with one embodiment of the present invention and an information processing system including the information processing apparatus.

Referring to FIG. 6, the data driven type information processing apparatus in accordance with one embodiment of the present invention includes input/output control units 4 and 8, a program storage unit 5, a firing control unit 6, and an operation unit 7 similar to the conventional data driven type information processing apparatus shown in FIG. 2. The data driven the information processing apparatus further includes tag attaching units 2 and 3 which are in the stage preceding the input/output control unit 4. In FIGS. 6 and 2, same reference numerals denote the same processing units whose functions thereof are the same. Therefore, detailed description thereof will not be repeated here.

The tag attaching units 2 and 3 shown in FIG. 6 receive data (including a data packet) included in input signals IN1 and IN2 applied externally to the information processing apparatus 1, attach a tag TB having the value of which is determined according to the order of input, generate a data packet and then apply the data packet to the input/output control unit 4. The input-/output control unit 4 receives the data packets applied from the tag attaching units 2 and 3 and the input/output control unit 8, and outputs the packets to the program storage unit 5 according to the order of input.

As shown in FIG. 6, the data driven type information processing apparatus 1 has tag attaching units 2 and 3 at its input stage, in addition to the conventional process function. Whether or not the externally applied data is attached with a tag, all the data packets generated here have tags attached there to and the data is transmitted to the next stage for data processing. An information processing apparatus which exchanges data directly with the information processing apparatus 1 connected on-line to the data driven type information processing apparatus 1 may be either of von Neumann type and non Neumann type (data driven type). Therefore, the diversity in structuring the information processing system including this information processing apparatus 1 is enhanced.

FIG. 7 shows an example of the structure of the information processing system including the data driven type information processing apparatus 1 shown in FIG. 6.

The system in FIG. 7 includes information processing apparatuses 20 and 30 which may be either of von Neumann type and non Neumann type (data driven type), the data driven type information processing apparatus 1 shown in FIG. 6, and a tracer TR. The tracer TR is a device for receiving the process result of data driven type information processing apparatus 1 and reporting the result externally, that is, a display apparatus substituting a printer.

When the system shown in FIG. 7 is in operation, the information processing apparatus 20 processes data and the process result is sequentially input directly to the data driven type information processing apparatus 1 as input signal IN1. At this time, tags are not attached to the data. A tag attaching unit 2 in the data driven type information processing apparatus 1 attaches a tag TB to the input data to enable the data driven type operation process in the information processing apparatus 1 and generates a data packet. The tag attaching unit 2 applies the generated data packet to the input/output control unit 4. After that, operation process according to the data flow program which is the same as that of the conventional data driven type information processing apparatus proceeds.

The input/output control unit 8 of the information processing apparatus 1 receives the data packet storing data of the operation result and then applies the data packet to the input/output control unit 4 if it is a not-yet-firing packet. Otherwise, the input/output control unit 8 outputs the data packet either as output signal OUT1 or OUT2 outside the information processing apparatus 1 based on the destination information stored in the data packet. The data packet the output as output signal OUT1 is applied directly to the information processing apparatus 30. The data packet the output as output signal OUT2 is applied to the tracer TR.

When the operation result of the data driven type information processing apparatus 1 is applied as the output signal OUT1, the information processing apparatus 30 carries out an operation process according to a predetermined program to the applied operation result. The result is input to the data driven type information processing apparatus 1 as input signal IN2. Responsively, the tag attaching unit 3 of the information processing apparatus 1 attaches the tag TB to the input data and generates a data packet. Thereafter, the data driven type information processing apparatus 1 carries out the data driven type operation process again on the data packet.

Meanwhile, the the data packet output from data driven type information processing apparatus 1 as output signal OUT2 is applied to the tracer TR. Since the tracer displays the processed data in real-time, the user can monitor the process situation of the information processing system.

Thus, the tag attaching unit 2 is provided in the input stage of the data driven type information processing apparatus 1, so that it is possible to carry out the same data driven type information processing as in the prior art with respect to the input data, no matter whether or not the tag TB is attached to the externally applied data. The information processing apparatus which transmits data on line mutually with the data driven type information processing apparatus 1 is not limited to either of von Neumann type or non Neumann type (including data driven type). The type of the information processing apparatus employed in the information processing system including the data driven type information processing apparatus 1 and the connecting variation thereof are diversified. The system allows a wide variety of data processing.

Figure 8:
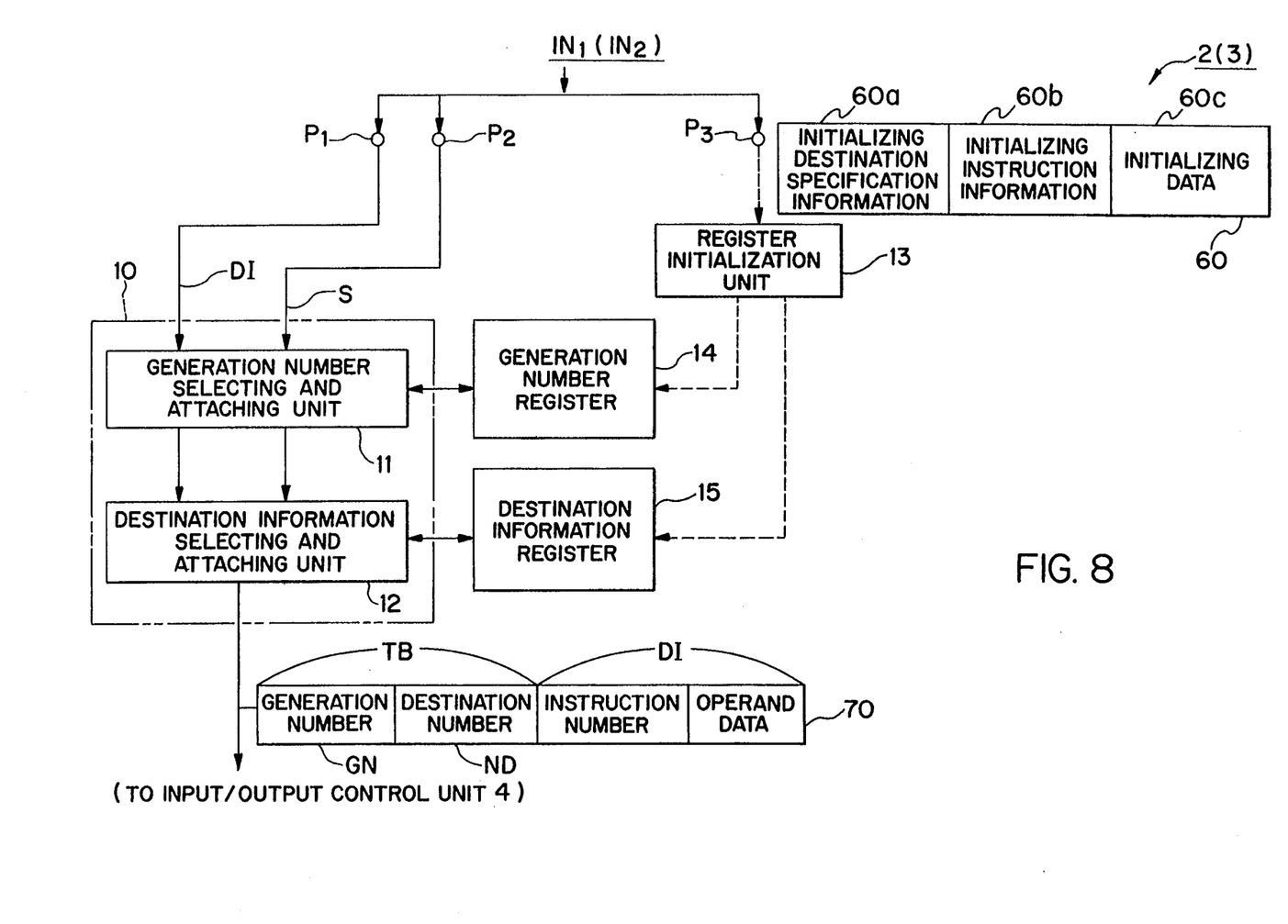
FIG. 8 is a block diagram of a tag attaching unit in accordance with one embodiment of the present invention.

FIG. 8 is a block diagram showing a tag attaching unit in accordance with one embodiment of the present invention. The tag attaching unit 2 (3) shown in FIG. 8 includes input ports P1, P2 and P3 which are connected to receive an input signal IN1 (IN2), a tag information coupling unit 10, a register initialization unit 13, a generation number register 14 and a destination information register 15.

The tag information coupling unit 10 includes a generation number selecting and attaching unit 11 and a destination information selecting and attaching unit 12.

The generation number register 14 is for prestoring a plurality of generation numbers to be attached to the data (including a packet data) externally applied in the form of input signal IN1 (IN2). The destination information register 15 is for prestoring a plurality of destination information to be attached to the data externally applied in the form of input signal IN1 (IN2).

The register initialization unit 13 is for initializing the generation number register 14 and destination information register 15 by using an initialization packet 60 which will be described later.

The tag information coupling unit 10 is for attaching a prescribed tag to data without a tag which is applied in the form of input signal IN1 (IN2) so as to generate a data packet 70 suitable for executing a data flow program prestored in the program storage unit 5 (see FIG. 6) and for applying the data packet to the input/output control unit 4.

The generation number selecting and attaching unit 11 receives an input data DI and a control signal S from the externally applied input signal IN1 (IN2) via input ports P1 and P2, respectively. The control signal S uniquely specifies the generation number or the destination information to be attached to corresponding input data from the register 14 or 15. The generation number selecting and attaching unit 11 accesses the generation number register 14 based on the input control signal S to read out the corresponding generation number to attach the same to an input data DI as a generation number GN. The data DI to which the generation number GN is attached is sent out to the destination information selecting and attaching unit 12 along with the control signal S.

The destination information selecting and attaching unit 12 accesses the destination information register 15 based on the control signal applied from the generation number selecting and attaching unit 11 to read out the corresponding destination information. The destination information selecting and attaching unit 12 attaches the read out destination information to the data DI (to which the generation number GN is attached) which is applied as a destination information, and then sends out the data DI to the input/output control unit 4. An execution packet 70 including the tag TB and the input data DI is applied from the tag attaching unit 2 (3) to the input/output control unit 4.

The operation of tag attaching unit 2 (3) will be described in the following.

Registers 14 and 15 are initialized by an initialization packet 60 which is received via route indicated by a chain line in FIG. 8. At this time, only port P3 of the input ports is activated. The initialization packet 60 is applied to the register initialization unit 13 in the form of input signal IN1 (IN2) through port P3. The initialization packet 60 includes information 60$a$ that specifies which register to initialize, instruction information 60$b$ which indicates how to initialize the register, and initializing data 60$c$.

The register initialization unit 13 selects either the generation number register 14 or the destination information register 15 based on the information 60$a$ stored therein and writes the initializing data 60$c$ according to the instruction information 60$b$ into the selected register. During initialization, since a plurality of different initialization packets 60 are allowed to be supplied externally, a plurality of different generation numbers and a plurality of destination information are stored in the generation number register 14 and destination information register 15, respectively.

After the initialization, the data driven type information processing apparatus transfers to an operational mode for executing a data flow program prestored stored in the program storage unit 5. In the program execution mode, only ports P1 and P2 of input ports of tag attaching unit 2 (3) are activated. Input signal IN1 (IN2) is applied to the tag information coupling unit 10 through the ports P1 and P2 as an input data DI and a control signal S, respectively. The tag information coupling unit 10 attaches the corresponding generation number GN and destination information ND based on the control signal S respectively to the input data DI in the manner described above to generate an execution packet 70 and applies the execution packet 70 to the input/output control unit 4.

Thus, after the initialization, the tag attaching unit 2 (3) attaches the corresponding tag TB to the data applied in form of the externally applied input signal IN1 (IN2) to generate the execution packet 70, and supplies the execution packet to the data driven type information processing function. As described above, the form of execution packet 70 is for executing the data flow program.

Note that the input data DI supplied externally to the data driven type information processing apparatus 1 is not limited to the information constituting execution packet 70 but it may carry data constituting a load packet to load the data flow the program to program storage unit 5, for example.

Figure 9:
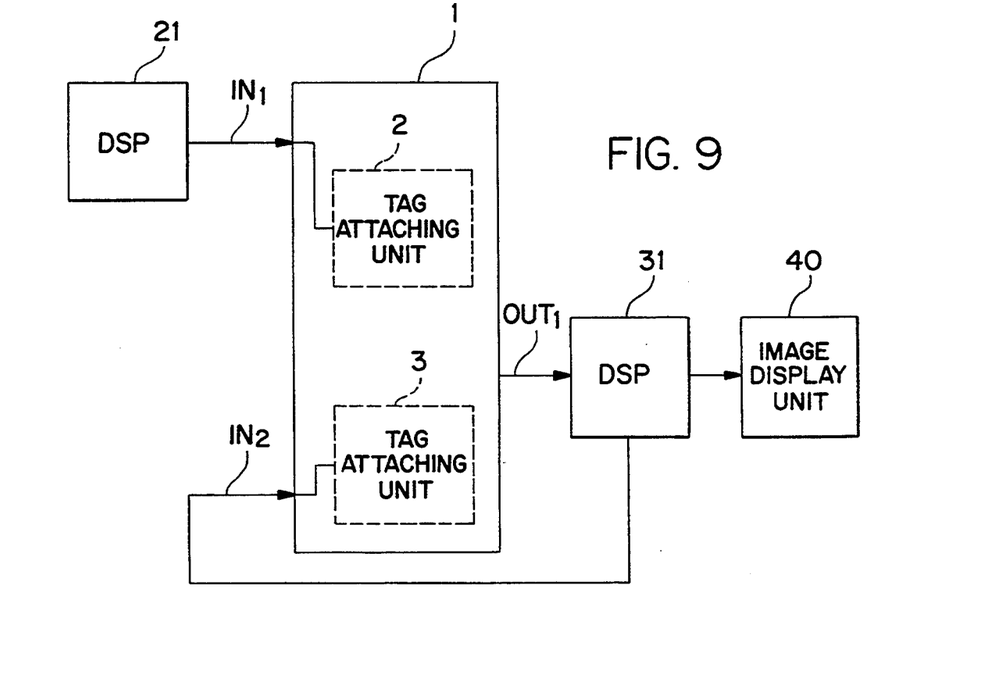
FIG. 9 shows a configuration of an image data processing system including a data driven type information processing apparatus in accordance with one embodiment of the present invention.

FIG. 9 is a configuration diagram of an image data processing system including the data driven type information processing apparatus in accordance with one embodiment of the present invention.

Note that the data processing in the processing system using the data driven type information processing apparatus in accordance with one embodiment of the present invention is not limited to the image processing described in the following. Generally, when the present invention is applied to the processing in which a large amount of data should be processed in real-time, the effect is remarkable.

Referring to FIG. 9, the image data processing system includes a data driven type information processing apparatus 1, digital signal processors 21 and 31 (hereinafter referred to as "DSPs") and an image display unit 40. The system carries out binary coding, filtering and contour correction processes to image data, while displaying it on the image display unit 40 in real-time. In the program memory of program storage unit 5 (see FIG. 6) in the data driven type information processing apparatus 1, data flow programs for the above described binary coding process, filtering process and contour correction process are supposed to be pre-stored. These data flow programs are assumed to be executed using data packets with generation numbers GN1, GN2 and GN3, respectively.

In operation, image the data is input to data driven type information processing apparatus 1 in the form of an input signal IN1 from DSP 21. The tag attaching unit 2 attaches a tag TB (generation number: GN1) to the image data to generate a data packet in the form of an execution packet 70 and applies the packet to the input/output control unit 4. Thereafter, operation process according to the program for the binary coding process of program storage unit 5 in the information processing unit 1 proceeds, and the outcome data is applied sequentially to DSP 31 in the form of output signal OUT1. DSP 31 receives the output signal OUT1, carries out a prescribed digital processing and applies the outcome to the image display unit 40, and applies the outcome to the information processing apparatus 1 in the form of signal IN2. Since binary coded image is displayed on the image display unit 40, the user can see the image with improved light and shade.

Meanwhile, input signal IN2 after binary coding process which has been applied to the information processing apparatus 1 from DSP 31 is applied to tag attaching unit 3. DSP 31 has signal IN2 includes a control signal S for specifying a generation number GN2, so that the next image processing is executed in the information processing apparatus 1. Since the tag attaching unit 3 receives an input signal IN2 including the control signal S specifying a generation number GN2, it applies an execution packet 70 to which a tag TB (generation number: GN2) is attached based on the signal to the input/output control unit 4. Then, the operation process for fitting according to the program stored in program storage unit 5 proceeds in the information processing apparatus 1, and the outcome data is sequentially applied to DSP 31 in the form of output signal OUT1. The DSP31 carries out a prescribed digital processing to the applied signal OUT1 and applies the processed signal to the image display unit 40 as well as to the information processing apparatus 1. Therefore, on the image display unit 40 an image which has been subjected to binary coding process and filtering (noise cancellation) is displayed.

Meanwhile, after filtering DSP 31 applies the image data to the tag attaching unit 3 of information processing apparatus 1 in the form of input signal IN2. Signal IN2 includes a control signal S specifying a generation number GN3, so that the next image processing is executed inside the information processing apparatus 1. The tag attaching unit 3 generates an execution packet 70 to which a tag TB (generation number: GN3) is attached, and applies the packet to the input/output control unit 4. Then, the operation process according to the program for contour correction process stored in the program storage unit 5 proceeds inside the information processing apparatus 1, and the outcome data is sequentially applied to the DSP 31 in the form of output signal OUT1. The DSP 31 carries out a prescribed digital processing to the signal OUT1 and applies the signal to the image display unit 40, so that the image of a high quality to which the binary coding process, filtering and contour correction are carried out is displayed on the image display unit 40.

In the foregoing image processing system, since the data driven type information processing apparatus 1 includes a tag attaching unit 2 (3), the apparatus 1 can process any kind of data input no matter whether or not a tag is attached to the data. Because of this, the apparatus can exchange data directly on-line with another information processing apparatus (e.g. DSP 21 or DSP 31) having different architecture. The information processing apparatus which is connected to the information processing apparatus 1 and carries out mutual data transmission is not limited to either von Neumann type or non Neumann type. Therefore, it is possible to construct an image data processing system by connecting the data driven type information processing apparatus with a variety of types other information processing apparatuses. Accordingly, a variety of image data processing can be carried out in the system.

According to the present invention described above, the tag attaching unit generates data packets to all of which tag information is attached and which are executable for data flow program and applies the packet to the information processing unit. Since the form of data applied externally to the information processing apparatus is not limited to a data packet, the diversity of input data allowed with respect to the information processing apparatus is enhanced.

Additionally, in constructing a system in which the information processing apparatus and another apparatus are connected on-line to carry out the processing by directly exchanging data, the form of data transmitted mutually therebetween is not limited to a data packet. Such a system can be constructed by utilizing various types of information processing apparatus including the data driven type information processing apparatus in the diversified connecting form. Accordingly, the diversity of data processing which can be carried out in the system is enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing apparatus, comprising:

information processing means for receiving an externally applied data packet and executing a prescribed data flow program based on information included in the data packet, said data packet including a data field and a tag field for storing tag information with respect to said data packet; and tag information attaching means including means for receiving externally applied untagged data for attaching tag information to the externally applied untagged data having no tag information according to a prescribed procedure to generate a tagged data packet and for applying said tagged data packet to said information processing means, said tag information attaching means including tag selecting means for selecting said tag information based on said untagged data.

2. The data driven type information processing apparatus according to claim 1, further comprising
a plurality of said tag information attaching means having respective separate inputs to receive data.

3. The data driven type information processing apparatus according to claim 1, wherein said tag information attaching means includes tag information storage means for storing a plurality of said tag information;

said tag selecting means receiving said externally applied untagged data and selecting specified tag information based on said untagged data from said plurality of tag information stored in said tag information storage means for attaching the selected tag information to said untagged data to generate said tagged data packet and for outputting said tagged packet to said information processing means.

4. The data driven type information processing apparatus according to claim 3, wherein said tag information attaching means further includes:

a plurality of said tag information storage means each for storing a different type of tag information; and a plurality of said tag selecting means corresponding to said plurality of tag information storage means for selecting respective tag information of said different types of tag information and attaching the selected tag information to said untagged data.

5. The data driven type information processing apparatus according to claim 4, wherein said plurality of tag selecting means are connected in series between an input for receiving an externally applied untagged data and an input of said information processing means, so that an output of preceding tag selecting means is connected to an input of succeeding tag selecting means.

6. The data driven type information processing apparatus according to claim 4, wherein said plurality of tag information storage means includes means for sorting a plurality of generation numbers, and means for storing a plurality of destination information;

said plurality of tag selecting means includes means for selecting one of said plurality of generation numbers based on said untagged data for attaching the selected number to said untagged data, and means for selecting one of said plurality of destination information based on said untagged data and for attaching the selected information to said untagged data.

7. The data driven type information processing apparatus according to claim 4 further comprising:

means for initializing said tag information storage means based on externally applied initialization data.

8. The data driven type information processing apparatus according to claim 7, wherein said initialization data includes information for specifying one of said plurality of tag information storage means, and initial value data;

said initializing means including means for writing said initial value data into a prescribed region of a specified one of said plurality of tag information storage means.

9. The data driven type information processing apparatus according to claim 3, further comprising:

means for initializing said tag information storage means based on externally applied initialization data.

10. The data driven type information processing apparatus according to claim 9, wherein said initializing data includes initial value data; and said initializing means includes means for selectively writing said initial value data into a prescribed region of said tag information storage means.

11. A method of processing data driven type information, comprising the steps of:

processing an externally applied data packet, said data packet including a data field and a tag field for storing tag information with respect to said data packet;

processing externally applied untagged data having no tag information;

selecting tag information from a plurality of tag information based on said untagged data;

attaching said selected tag information to said untagged data according to a prescribed procedure;

generating a tagged data packet having said selected tag information attached to said data;

directing said tagged data packet for information processing; and executing a prescribed data flow program based on information stored in said data packets.

12. The method of claim 11, wherein a plurality of tag information attaching means each attaches said tag information to said untagged data.

13. The method of claim 12, further comprising storing said plurality of tag information in a plurality of tag information storage means, each storing a different type of tag information, and said selecting step including a plurality of tag selecting means for selecting respective tag information from said different types of tag information.

14. The method of claim 13, wherein said storing step includes storing a plurality of generation numbers and a plurality of destination information, one of said plurality of tag selecting means selecting one of said generation numbers and another one of said plurality of tag selecting means selecting one of said destination information for attaching said selected generation number and destination information to said untagged data.

15. The method of claim 14, wherein said plurality of tag selecting means are connected in series.

16. The method of claim 13, further comprising initializing said plurality of tag information storage means based on externally applied initialization data, said initialization data including initial value data and information for specifying one of said plurality of tag information storage means.

17. The method of claim 16, wherein said initializing step includes selectively writing said initial value data into a prescribed region of one of said tag information storage means specified in said initialization data.

* * * * *

UNITED STATES PATENT AND TRADEMARK OFFICE
CERTIFICATE OF CORRECTION

PATENT NO. : 5,452,464
DATED : September 19, 1995
INVENTOR(S) : Shingo NOMURA, Takeshi MURAMATSU, Souichi MIYATA, Tatsuyuki KUWABARA, Masaharu TOMITA, Kiyotaka NAGAMURA & Takao**

It is certified that error appears in the above-indentified patent and that said Letters Patent is hereby corrected as shown below:

On the title page, item [73],

Please change "Sharp Kabushiki Kaisha, Osaka, Japan" to --Sharp Kabushiki Kaisha, Osaka, Japan and Japan Radio Co., Ltd., Tokyo, Japan--

Signed and Sealed this

Sixteenth Day of July, 1996

Attest:

BRUCE LEHMAN

*Attesting Officer*    *Commissioner of Patents and Trademarks*